US011579392B2

(12) United States Patent
Diepstraten et al.

(10) Patent No.: US 11,579,392 B2
(45) Date of Patent: Feb. 14, 2023

(54) INDEXING CABLE ARRANGEMENT AND ENCLOSURE FOR USE THEREWITH (71) Applicant: COMMSCOPE TECHNOLOGIES LLC, Hickory, NC (US)

(72) Inventors: Patrick Jacques Ann Diepstraten, Heusden-Zolder (BE); Dean R. Pettigrew, Bayswater North (AU); Paul David Hubbard, Silverwater (AU); Steven James Dick, Croydon South (AU); Dennata Radiansari, Rowville (AU)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/272,224

(22) PCT Filed: Aug. 21, 2019

(86) PCT No.: PCT/US2019/047537
§ 371 (c)(1),
(2) Date: Feb. 26, 2021

(87) PCT Pub. No.: WO2020/046681
PCT Pub. Date: Mar. 5, 2020

(65) Prior Publication Data
US 2021/0311279 A1    Oct. 7, 2021

Related U.S. Application Data (60) Provisional application No. 62/724,266, filed on Aug. 29, 2018.

(51) Int. Cl.
G02B 6/44    (2006.01)
G02B 6/38    (2006.01)

(52) U.S. Cl.
CPC ........... G02B 6/4471 (2013.01); G02B 6/389 (2013.01); G02B 6/4454 (2013.01)

(58) Field of Classification Search
CPC .............................. G02B 6/389; G02B 6/4454
See application file for complete search history.

(56) References Cited

U.S. PATENT DOCUMENTS 5,317,663 A    5/1994    Beard et al.
6,017,154 A    1/2000    Carlisle et al.
(Continued)

FOREIGN PATENT DOCUMENTS

WO    2013/149150 A1    10/2013
WO    2017/046185 A2    3/2017
(Continued)

OTHER PUBLICATIONS

International Search Report and Written Opinion of the International Searching Authority for International Patent Application No. PCT/US2019/047537 dated Dec. 16, 2019, 15 pages.
(Continued)

Primary Examiner — Sung H Pak
(74) Attorney, Agent, or Firm — Merchant & Gould P.C.

(57) ABSTRACT

An indexed cable arrangement can be installed in a re-enterable housing. The optical fibers of the cable are indexed between a first; ruggedized multi-fiber connector and a second multi-fiber connector. The second multi-fiber connector may be non-ruggedized and disposed within the housing (e.g., at an adapter) or ruggedized and disposed external of the housing (e.g., terminating a stub cable). One or more drop lines are terminated by respective non-ruggedized, single-fiber connectors disposed within the housing. In certain examples, drop lines may be split into multiple connectorized single-fiber outputs.

24 Claims, 10 Drawing Sheets

(56) References Cited

U.S. PATENT DOCUMENTS

| | | |
|---|---|---|
| 7,264,402 B2 | 9/2007 | Theuerkorn et al. |
| 7,744,286 B2 | 6/2010 | Lu et al. |
| 7,744,288 B2 | 6/2010 | Lu et al. |
| 7,762,726 B2 | 7/2010 | Lu et al. |
| 7,942,590 B2 | 5/2011 | Lu et al. |
| 7,959,361 B2 | 6/2011 | Lu et al. |
| 9,207,421 B2 | 12/2015 | Conner |
| 9,348,096 B2 | 5/2016 | Kmit et al. |
| 9,557,498 B2 | 1/2017 | Loeffelholz |
| 9,739,945 B2 | 8/2017 | Dowling |
| 9,766,414 B2 | 9/2017 | Marcouiller et al. |
| 9,810,851 B2 | 11/2017 | Lu |
| 9,851,525 B2 | 12/2017 | Loeffelholz et al. |
| 10,033,463 B2 | 7/2018 | Hubbard et al. |
| 10,317,640 B2 | 6/2019 | Marcouiller |
| 10,502,920 B2 | 12/2019 | Coenegracht et al. |
| 2013/0034330 A1 | 2/2013 | Barron et al. |
| 2014/0254986 A1 | 9/2014 | Kmit et al. |
| 2015/0378112 A1* | 12/2015 | Marcouiller ....... H04B 10/2755 385/56 |
| 2016/0097909 A1 | 4/2016 | Loeffelholz et al. |
| 2016/0223759 A1 | 8/2016 | Marcouiller et al. |
| 2018/0011271 A1 | 1/2018 | Reagan et al. |
| 2020/0088964 A1* | 3/2020 | Desard ................ H02G 15/013 |
| 2020/0209479 A1 | 7/2020 | Zhang et al. |

FOREIGN PATENT DOCUMENTS

| | | |
|---|---|---|
| WO | 2018/046450 A1 | 3/2018 |
| WO | 2018/132576 A1 | 7/2018 |
| WO | 2018/197410 A1 | 11/2018 |
| WO | 2018/231833 A1 | 12/2018 |
| WO | 2020/028659 A1 | 2/2020 |

OTHER PUBLICATIONS

Chinese Office Action for Chinese Patent Application No. 201980056044.7 dated Mar. 9, 2022, 17 pages.

Extended European Search Report for European Patent Application No. 19856320.7 dated Apr. 26, 2022, 10 pages.

* cited by examiner

INDEXING CABLE ARRANGEMENT AND ENCLOSURE FOR USE THEREWITH

CROSS-REFERENCE TO RELATED APPLICATION

This application is a National Stage Application of PCT/US2019/047537, filed on Aug. 21, 2019, which claims the benefit of U.S. Patent Application Ser. No. 62/724,266, filed on Aug. 29, 2018, the disclosures of which are incorporated herein by reference in their entireties. To the extent appropriate, a claim of priority is made to each of the above referenced applications.

BACKGROUND

As demand for telecommunications increases, fiber optic networks are being extended in more and more areas. In facilities such as multiple dwelling units, apartments, condominiums, businesses, etc., fiber optic enclosures are used to provide a subscriber access point to the fiber optic network. These fiber optic enclosures are connected to the fiber optic network through subscriber cables connected to a network hub. However, the length of subscriber cable needed between the fiber optic enclosure and the network hub varies depending upon the location of the fiber optic enclosure with respect to the network hub. As a result, there is a need for a fiber optic enclosure that can effectively manage varying lengths of subscriber cable.

SUMMARY

Some aspects of the disclosure are directed to a cable arrangement including optical lines indexed between two multi-fiber connectors. At least one optical line drops from one of the multi-fiber connector. A first of the multi-fiber connectors is ruggedized. The connectorized end(s) of the dropped optical line(s) is non-ruggedized.

In some examples, the second multi-fiber connector is ruggedized. In other examples, the second multi-fiber connector is non-ruggedized.

In certain implementations, the dropped optical line is optically coupled to a splitter arrangement including a plurality of connectorized splitter outputs.

In certain implementations, each optical line is formed by two or more optical fibers. For example, two optical fibers may be spliced together to form the optical line. In an example, the indexed optical lines may be formed by a mass fusion splice between a first group of optical fibers and a second group of optical fibers. In another example, the splitter arrangement may be optically spliced to the dropped optical line.

Other aspects of the disclosure are directed to a re-enterable enclosure at which an indexing cable can be installed. In some implementations, the second multi-fiber connector of the indexing cable is disposed external to the enclosure. For example, the second multi-fiber connector may terminate a stub cable extending from the enclosure. In other implementations, the second multi-fiber connector is sealed within the enclosure. In an example, the second multi-fiber connector is optically accessible from an exterior of the enclosure via a ruggedized optical adapter or other connection interface location. In another example, the second multi-fiber connector is not optically accessible from an exterior of the enclosure until the enclosure is entered (i.e., opened).

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to a cable arrangement for use in an indexing architecture. As the term is used herein, "indexing" refers to shifting optical lines along sequential fiber positions between two optical connectors when at least one of the optical lines is dropped between the two optical connectors. Bi-directional indexing refers to such shifting when at least one optical line from each of the two optical connectors is dropped.

Figure 1:
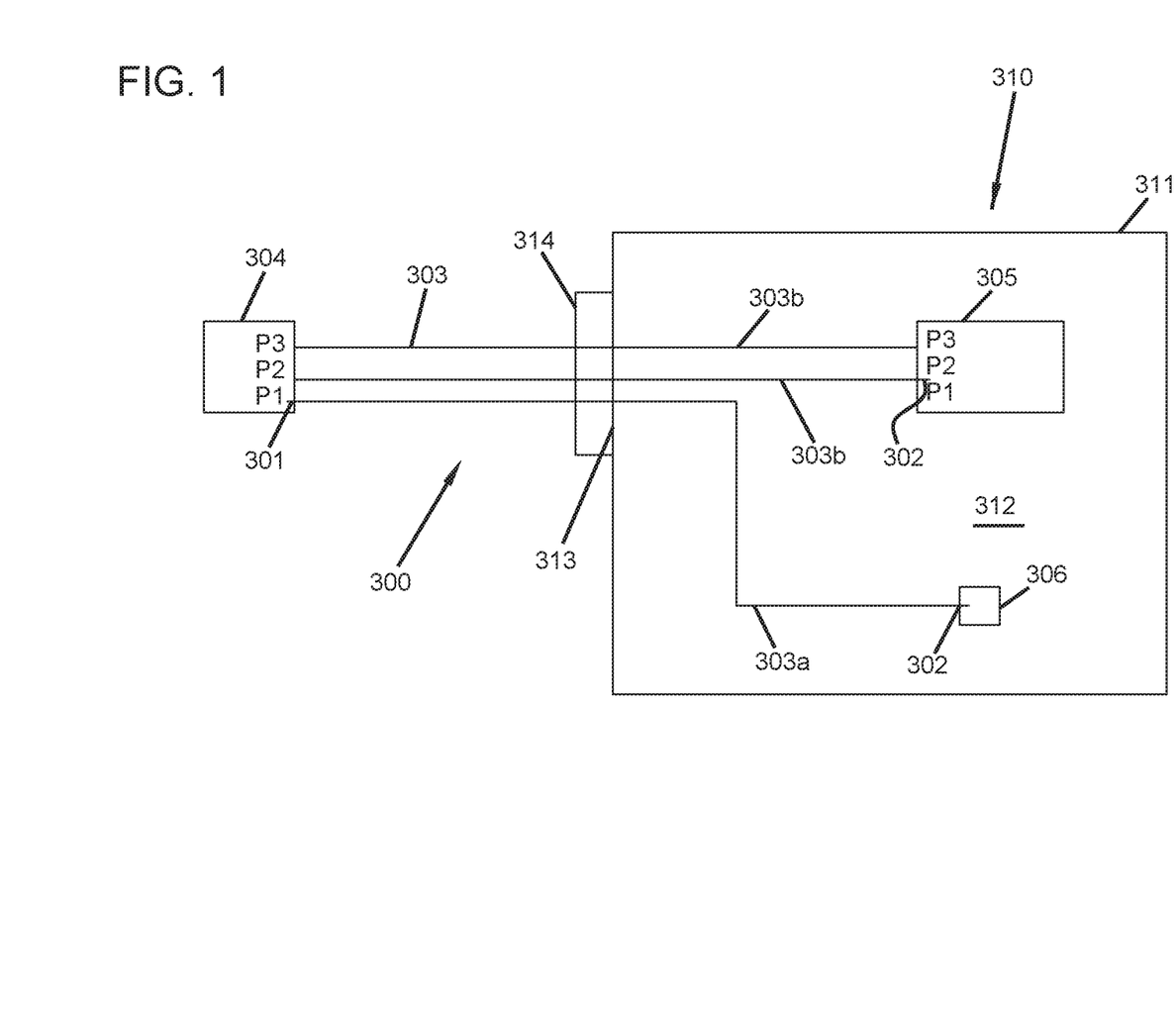
FIG. 1 is a schematic diagram of an example enclosure in which an example indexing cable arrangement is installed.

FIG. 1 is a schematic diagram of an example enclosure 310 in which an indexing cable arrangement 300 is installed. The indexing cable arrangement 300 includes optical lines 303 that extend between respective first and second ends 301, 302. A first multi-fiber connector 304 is disposed at the first ends 301 of the optical lines 303. A single-fiber connector 306 is disposed at the second end 302 of a first 303a of the optical lines 303. A second multi-fiber connector 305 is disposed at the second ends 302 of others 303b of the optical lines 303.

Each of the multi-fiber connectors 304, 305 defines a plurality of fiber positions $P_1$-$P_3$. While three fiber positions are shown in FIG. 1 for ease in viewing, it will be understood that each multi-fiber connector can include a greater or lesser number of fiber positions (e.g., 4 positions, 6 positions, 8 positions, 10 positions, 12 positions, 16 positions, 18 positions, 24 positions, 36 positions, 48 positions, 96 positions, 144 positions, etc.).

The first optical line 303a (i.e., a "drop" line) extends from the first sequential position $P_1$ of the first multi-fiber connector 304 to the single-fiber connector 306. A second optical line 303b (i.e., an "indexed" line) extends from the second sequential position $P_2$ of the first multi-fiber connector 304 to the first sequential position $P_1$ of the second multi-fiber connector 305. Subsequent optical lines of the cable extend from the subsequent fiber positions $[P_{2+N}]$ at the first multi-fiber connector 304 to the subsequent fiber positions $[P_{1+N}]$ at the second multi-fiber connector 305. For example, a third optical line extends from the third sequential position $P_3$ of the first multi-fiber connector 304 to the second sequential position $P_2$ of the second multi-fiber connector 305. As noted above, such shifting the optical lines 303b along the sequential fiber positions "indexes" the optical lines 303b between the two connectors 304, 305.

In the example shown, no optical line is received at the final sequential fiber position (position $P_3$) of the second multi-fiber connector 305. Alternatively, in a bidirectional indexing architecture, a drop line may extend from the final sequential fiber position of the second multi-fiber connector 305.

Additional information regarding fiber indexing and bi-directional fiber indexing can be found in U.S. Publication No. 2014/0254986, the disclosure of which is hereby incorporated herein by reference.

In certain implementations, the first multi-fiber connector 304 is a hardened/ruggedized multi-fiber connector (HMFOC). As the terms are used herein, "ruggedized" optical connectors and "ruggedized" optical adapters are configured to mate together to form an environmental seal. Some non-limiting example ruggedized optical connector interfaces suitable for use with an indexing terminal are disclosed in U.S. Pat. Nos. 7,744,288, 7,762,726, 7,744,286, 7,942,590, and 7,959,361, the disclosures of which are hereby incorporated herein by reference.

In certain examples, HMFOC's can include environmental seals for sealing the connectors in outside environments. HMFOC's can include fasteners such as threaded or bayonet-style fasteners for providing robust connector-to connector mechanical connections. HMFOC's can include male connectors on cables, female connectors on cables, ports/adapters on housings and other structures. HMFOC's can include multi-fiber ferrules including fiber receiving arrangements defining a plurality of fiber receiving positions. In certain examples, the fiber receiving positions can be arranged in one or more rows of fiber receiving positions.

Figure 2:
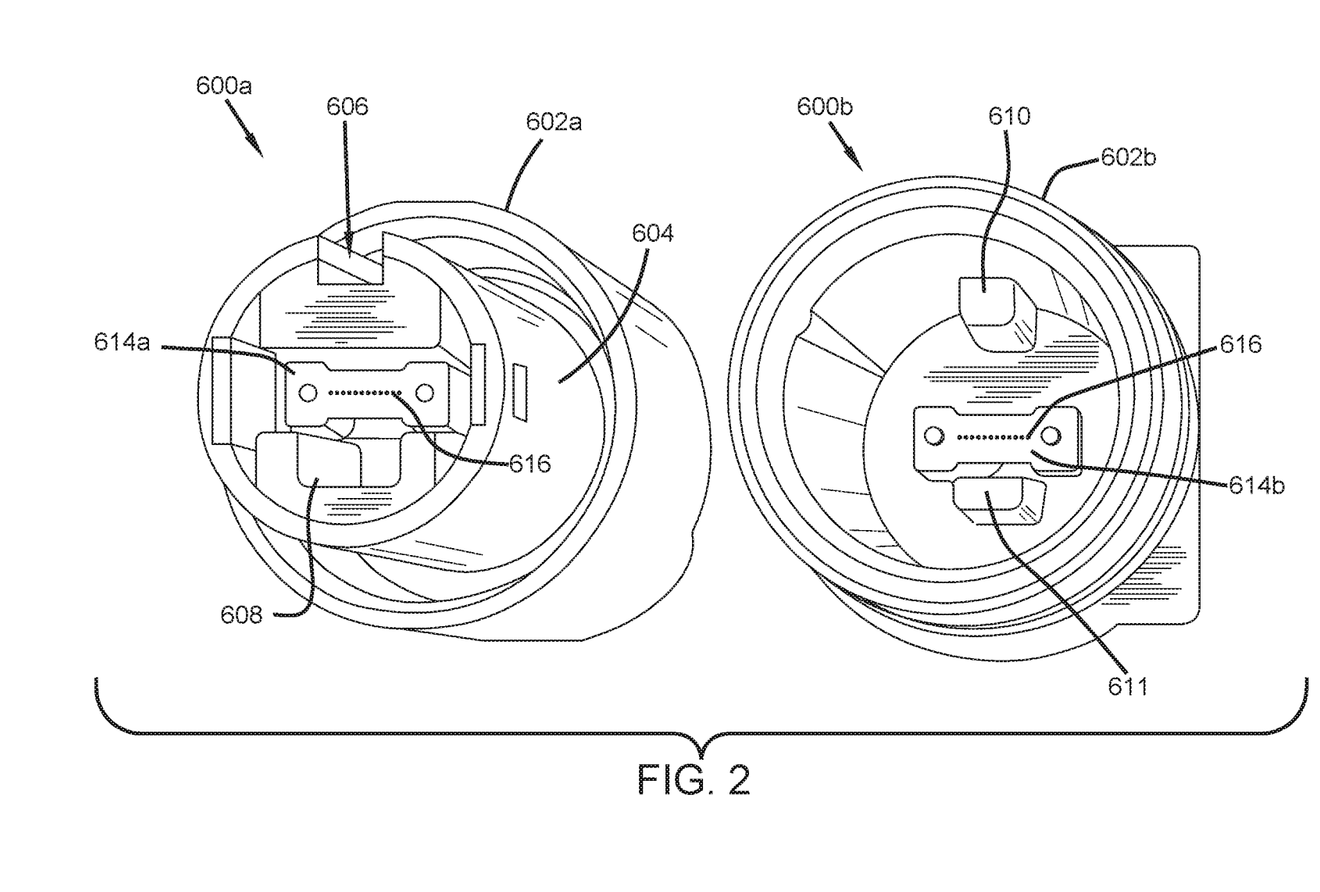
FIG. 2 shows example mating male and female HMFOC connectors.

FIG. 2 shows example mating male and female HMFOC connectors 600a, 600b. The male and female connectors 600a, 600b include intermatable mechanical coupling interfaces. For example, the male connector 600a includes an internally threaded nut 602a that threads on a threaded portion 602b of the female connector 600b. Also, the male connector 600a includes a plug portion 604 with openings 606, 608 that mate with projections 610, 611 of the female connector 600b to provide alignment during coupling. The connectors 600a, 600b include ferrules 614a, 614b having fiber receiving arrangements that include sequential fiber positions 616 (e.g., a row of twelve fiber receiving positions) that align when the connectors 600a, 600b are mated to provide optical connections between the optical fiber supported by the ferrules 614a, 614b. Further details of example HMFOC connectors are disclosed at U.S. Pat. No. 7,264,402, which is hereby incorporated by reference in its entirety.

In some implementations, the second multi-fiber connector 305 is a hardened/ruggedized multi-fiber connector (HMFOC). In other implementations, the second multi-fiber connector 305 is a non-hardened/ruggedized multi-fiber connector. A non-ruggedized multi-fiber connector refers to a connector that is not configured to be environmentally sealed to an adapter or other such component. One example non-ruggedized multi-fiber connector is an MPO connector.

Figure 3:
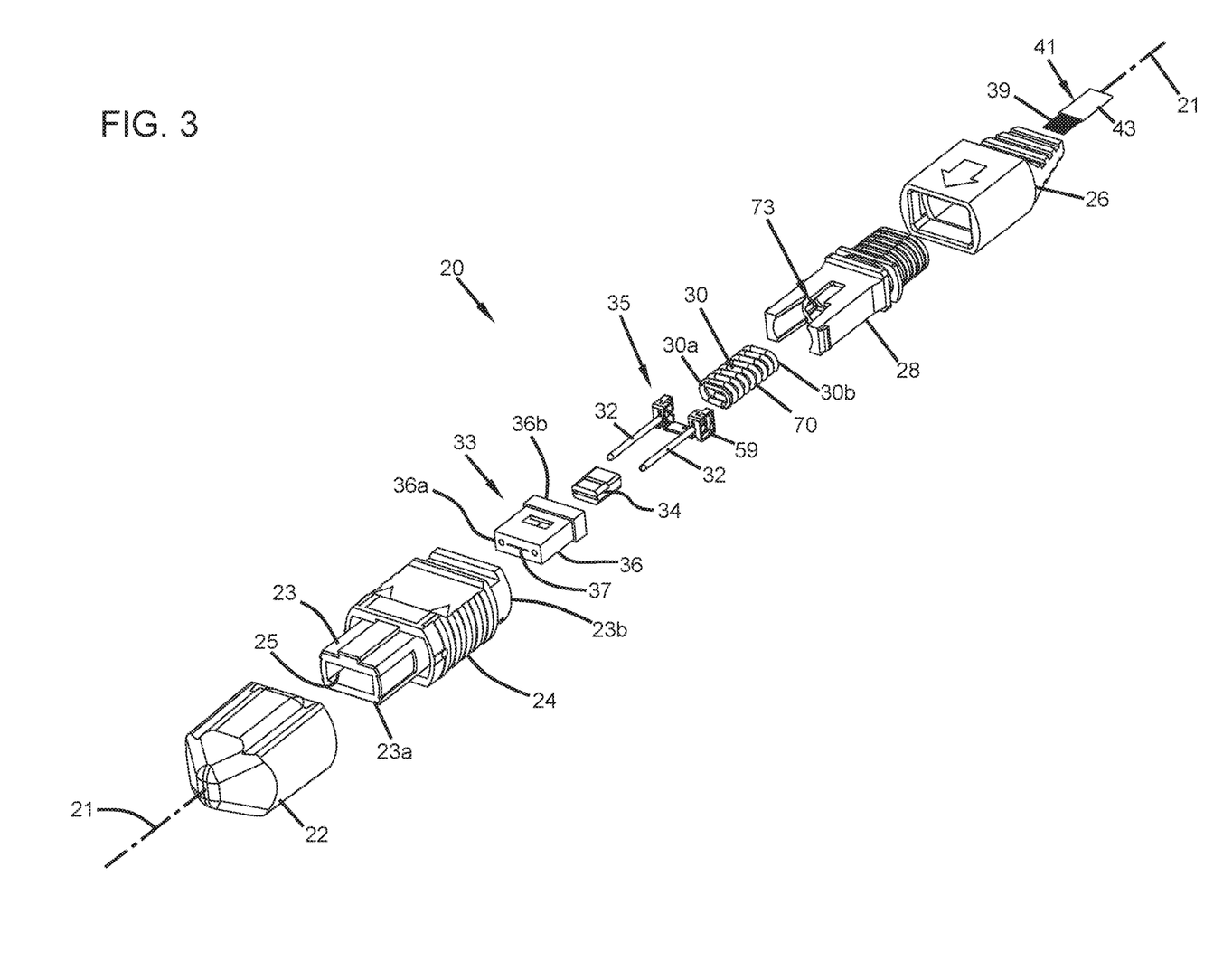
FIG. 3 illustrates an example non-ruggedized multi-fiber connector.

FIG. 3 illustrates an example non-ruggedized multi-fiber connector 20. The non-ruggedized multi-fiber connector 20 can include a dust cap 22, a connector body 23, a release sleeve 24, a spring push 28, and a connector boot 26. The release sleeve 24 is mounted on the connector body 23 and can slide over a limited range of movement in a distal-proximal orientation relative to the connector body 23. The release sleeve 24 can be spring biased in the distal direction and can be retracted from the distal position to release the connector 20 from a mating fiber optic adapter (not shown). The connector boot 26 mounts over a proximal end of the spring push 28.

In certain implementations, the non-ruggedized multi-fiber connector 20 includes a ferrule assembly 33 that mounts within a ferrule passageway 25 of a connector body 23. The ferrule assembly 33 includes a multi-fiber ferrule 36 that defines at least one row of fiber openings 37 that extend through a distal end 36a of the ferrule 36 in distal-to-proximal direction. Each opening 37 defines one of the sequential fiber positions. The fiber openings 37 are adapted for supporting the ends of optical fibers 39 (e.g., broken out from a matrix material 43 an optical fiber ribbon 41). When the ferrule 36 is assembled within the connector body 23, the distal end 36a of the ferrule 36 is accessible at the distal end 23a of the connector body 23 so as to facilitate making an optical connection with another multi-fiber fiber optic connector.

The ferrule assembly 33 further includes a ferrule boot 34 that mounts at a proximal end 36b of the ferrule 36. The ferrule boot 34 is adapted for receiving and guiding the fiber ribbons 41 into the ferrule 36. The ferrule assembly 33 further includes an alignment pin assembly 35. In certain examples, the alignment pin assembly 35 includes alignment pins 32 having base ends supported within a pin base 59. The alignment pins fit within longitudinal pin openings 51 defined by the ferrule 36. In other examples, the ferrule 36 defines alignment holes to receive alignment pins of a mating connector.

Strength members of a cable terminated by the non-ruggedized connector 20 can be coupled (e.g., crimped) to a proximal end of a spring push 28 of the fiber optic connector 20. A spring 30 of the multi-fiber connector 20 functions to bias the ferrule 36 in a distal direction relative to the connector body 23. When the connector 20 is assembled, the spring 30 can be captured between the proximal end 36b of the ferrule 36 and a spring seat 73 of the spring push 28. A distal end 30a of the spring 30 can engage the pin base 59 of the ferrule assembly and a proximal end 30b of the spring 30 can engage the spring seat 73 of the spring push 28. Further details of example non-ruggedized multi-fiber connectors are disclosed in U.S. Pat. No. 9,810,851, which is hereby incorporated by reference in its entirety.

Referring back to FIG. 1, the single-fiber connector 306 can be non-ruggedized. Example non-ruggedized single fiber connectors 306 include LC connectors (see FIG. 4) and SC connectors (see FIG. 5).

Figure 4:
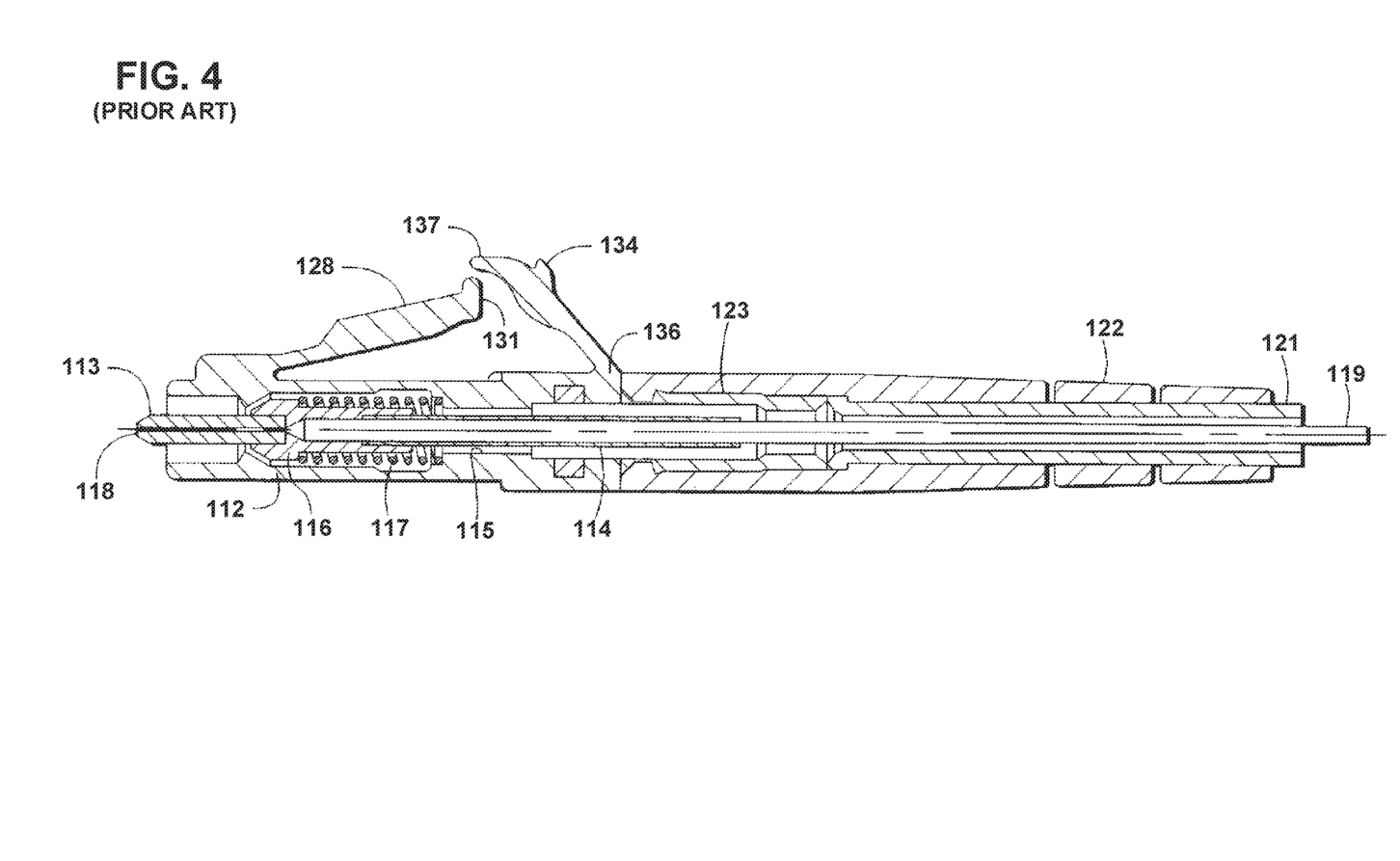
FIG. 4 illustrates a first example non-ruggedized single-fiber connector.

FIG. 4 illustrates a first example non-ruggedized, single-fiber connector 11. A first example connector 111 includes a housing member 112 defining a passage 115. A ferrule 113 and a barrel member 114 are disposed within the passage 115. The barrel member 114 has an enlarged portion or flange 116 which forms a shoulder against which one end of a coiled spring 117, which surrounds the barrel, bears. The other end of spring 117 bears against a shoulder formed in the bore 115 within housing 112. The ferrule and barrel assembly has a forward bias relative to the housing 112, which enhances face-to-face contact of the ferrule end face 118 with the ferrule end face of a mating connector or equipment (not shown). A cable including an optical fiber 119, a jacket 121, and strength members enter the connector 111 through a strain relief boot 122 and a base member 123, which has latches 124 for mounting to the housing 112 at the rear thereof. The rear of base member 123 has a grooved portion 126 extending axially therefrom onto which jacket 121 or the strength members are gripped.

A cantilever latch arm or member 128 extends between one end 129 affixed to the housing 112 and a free distal end 131. The latch member 128 has first and second lobes or shoulders 132 and 133 which are adapted to engage latching shoulders in the connector receptacle or adapter (not shown). When the first example connector 112 is inserted into an adapter or receptacle, the latch arm 128 is depressed as the connector is moved forward until a clearance within the adapter allows the lobes 132 and 133 snap into latching engagement with shoulders formed within the adapter. When it is desired to remove the connector from the adapter, depression of the free end 131 of latching arm 128 disengages the lobes from the shoulders and the connector may be pulled out. When a user desires to remove the connector from its associated adapter or receptacle, he or she can depress latching arm 128 by depressing the free end 137 of trigger member 134.

Figure 5:
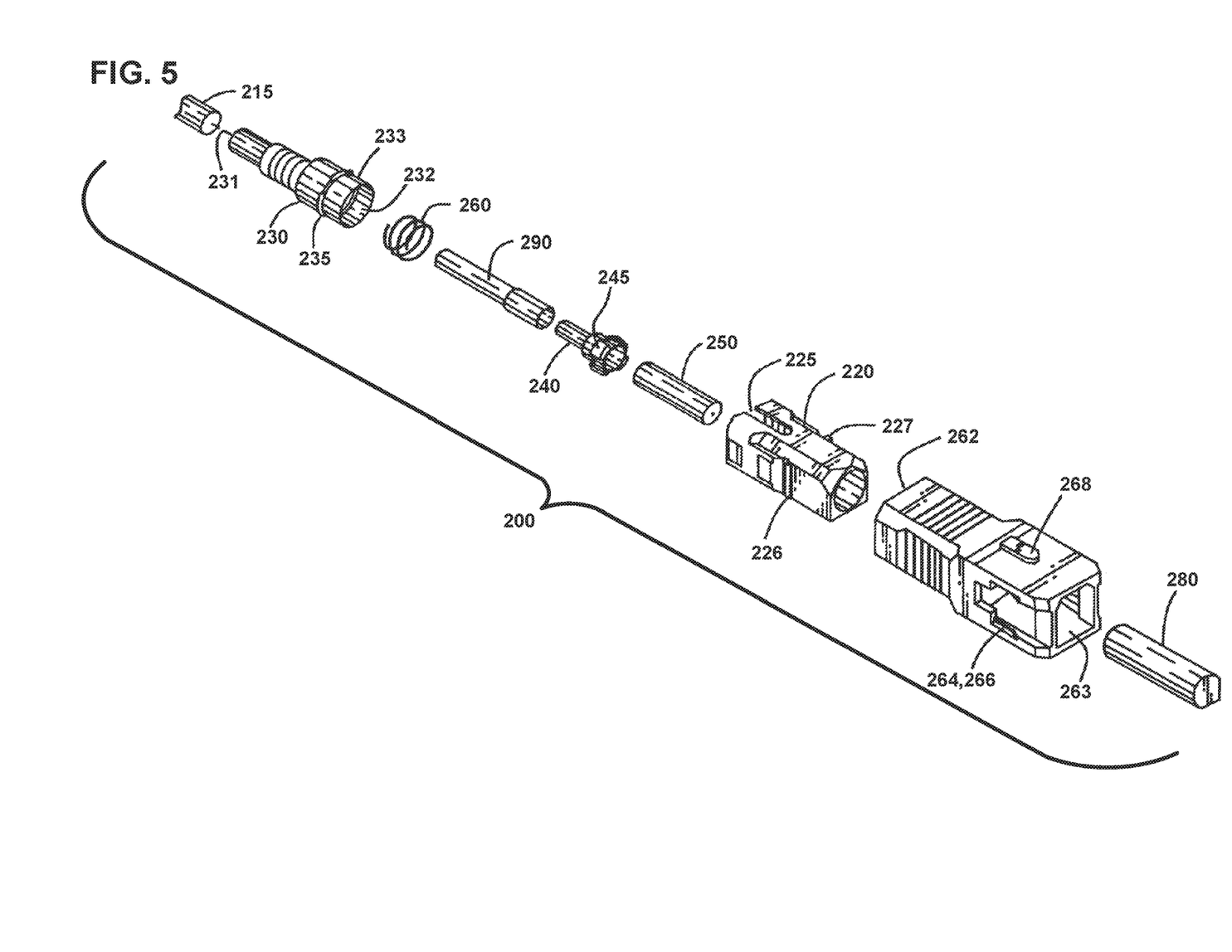
FIG. 5 illustrates a second example non-ruggedized single-fiber connector.

FIG. 5 illustrates a second example non-ruggedized, single-fiber connector 200. A fiber optic cable 215 enters into the non-ruggedized, single-fiber connector 200 through a guide 230. Guide 230 has an input opening 231 at one end to receive the fiber optic cable 215 and a hub opening 232 at its other end. The input opening 231 of the guide 230 shares its diameter with the first portion of the guide 230 while the hub opening 232 shares its diameter with remainder of the guide 230. Located within the guide 230 is tubing 290 which surrounds the outer diameter of the fiber optic cable 215. Tubing 290 aids in guiding the fiber optic cable 215 into the ferrule 250. Within the guide 230 is a coil spring 260, coil spring 260 surrounds tubing 290, spring 260 is operative in allowing the fiber optic cable 215 a small amount of travel when tensioned.

The hub 240 is designed to be connected to the ferrule holder 220. Hub 240 may have tabs or keys 245 spaced 290 degrees apart from each other. Hub 240 fits within the guide 230 through its input opening 231. Hub 240 is operative in retaining spring 260 in the guide 230. Ferrule 250 fits within hub 240 and firmly holds the fiber optic cable 215 in place.

Key 235 is located on the outer surface of the guide 230. This key is designed to fit into slot 225 located on the ferrule holder 220. Once key 235 is in place the guide 230 is firmly locked into the ferrule holder 220.

The ferrule holder 220 holds the ferrule 250 rigidly in its axial bore. On opposite sides of the exterior of ferrule holder 220 are two sets of parallel ridges 226 and 227, which are generally perpendicular to the axial bore of ferrule holder 220. These ridges are designed to be releasably locked to retaining clips of a corresponding adapter (not shown) through cut-outs 264 and 266 respectively. Ferrule holder 220 is located within the outer connector or grip housing 260.

The grip housing 260 generally has four sides and an opening 262 to receive the guide 230 and an opening 263 to deliver ferrule 250 to the split sleeve 250. When ferrule holder 220 is placed within the grip housing 260 each pair of raised ridges 226 and 227 are exposed through a cut out 264 and 266 respectively. A key 268 is designed to fit into a slot defined by the corresponding adapter.

Further details of example non-ruggedized single-fiber connectors are disclosed in U.S. Pat. Nos. 5,317,663 and 6,017,154, which are hereby incorporated by reference in their entirety.

Referring back to FIG. 1, the enclosure 300 includes a housing 311 defining an interior 312. In certain implementations, the housing 311 is re-enterable. As the term is used herein, a "re-enterable" housing includes a housing that is openable so that the interior 312 can be accessed by a user without breaking the housing 311. For example, the housing 311 may include a cover or door that selectively covers an access opening defined by the housing 311. In one example, a cover is removable from the access opening to open the housing 311. In another example, a door pivots between open and closed positions relative to the housing 311 to expose and cover the access opening.

The second multi-fiber connector 305 and the single-fiber connector 306 are disposed within the interior 312 of the housing 311. The second multi-fiber connector 305 and the single-fiber connector 306 are accessible by a user when the housing 311 is open. At least the single-fiber connector 306 is not accessible by a user when the housing 311 is closed. In certain implementations, the second multi-fiber connector 305 is not accessible by a user when the housing 311 is closed.

The housing 311 defines a cable port 313 extending between an exterior of the housing and the interior 312 of the housing 311. A sealing arrangement 314 is disposed at the cable port 313 to environmentally seal the interior 312 of the housing 311. In an example, the sealing arrangement 314 includes a gasket (e.g., an O-ring, a gel-seal member, a foam block, etc.) through which the cable 300 passes. In some implementations, the cable 300 is movable (e.g., slidable) through the cable port 313 and sealing arrangement 314. In other implementations, the cable 300 is fixed at the cable port 313.

In accordance with some aspects of the disclosure, the drop line 303a of the cable arrangement 300 is optically coupled to an optical splitter arrangement 307 to splits optical signals carried by the drop line 303a onto a plurality of splitter outputs. Each splitter output is terminated by a single-fiber connector (e.g., a non-ruggedized single-fiber connector 306). Accordingly, the cable arrangement 300 may have multiple single-fiber connectors 306 despite dropping only one optical line 303a.

In alternative implementations, multiple optical lines may be dropped. In certain such implementations, the number of sequential fiber positions along which the optical lines are indexed corresponds to the number of optical lines being dropped. For example, optical lines are indexed two fiber positions if two optical lines are dropped.

Figure 6:
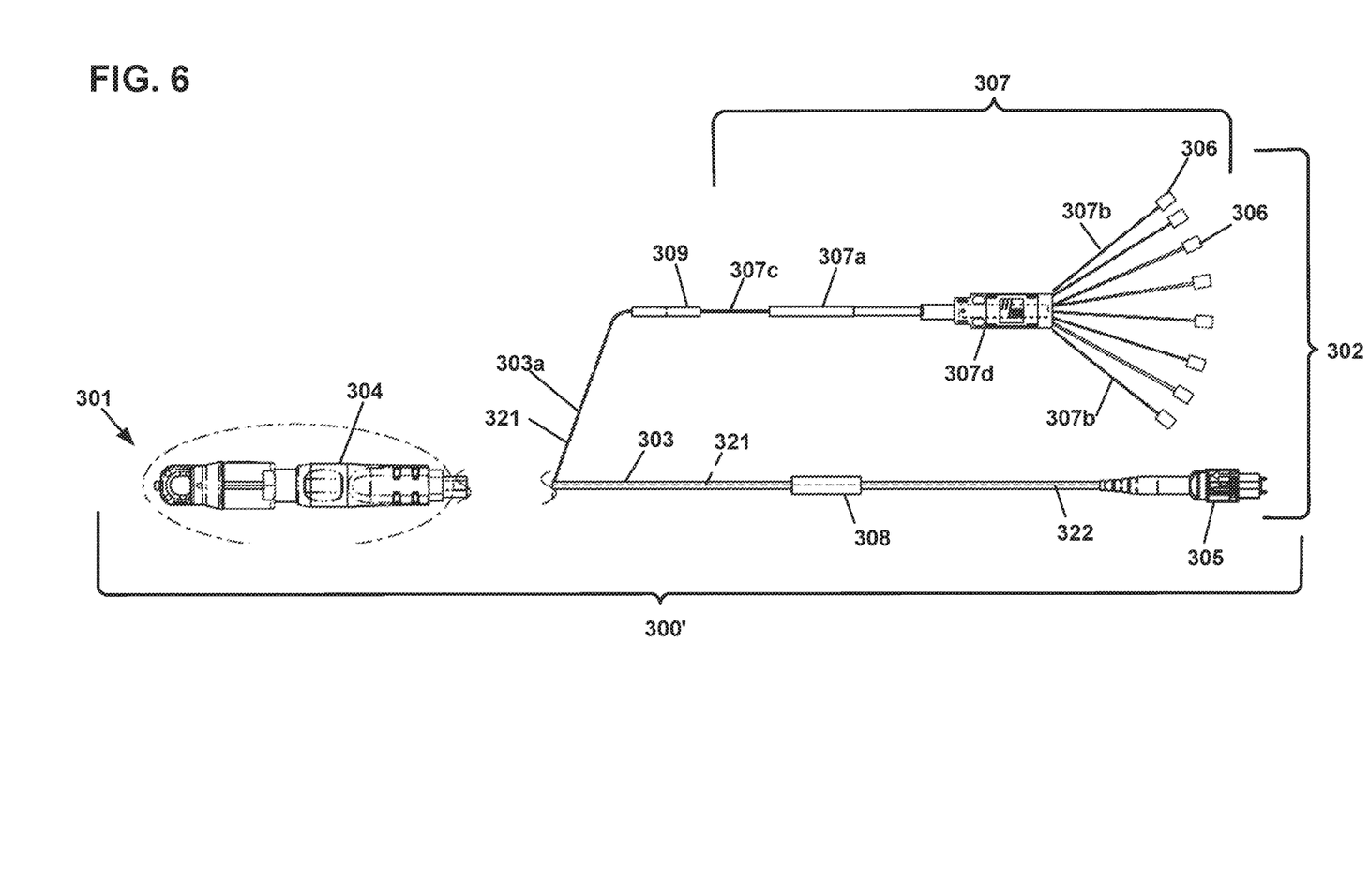
FIG. 6 illustrates an example indexing cable arrangement including an optical splitter arrangement coupled to the dropped optical line.

FIG. 6 illustrates an example cable arrangement 300' suitable for use with the enclosure 310 of FIG. 1 or the other enclosures disclosed herein. The cable arrangement 300' includes an optical splitter arrangement 307 coupled to the dropped optical line. The optical splitter arrangement 307 includes an optical splitter 307a and a plurality of splitter output lines 307b. In some examples, the optical splitter arrangement 307 also includes a splitter input line 307c that optically couples to the dropped optical line. In other examples, the optical splitter 307a is configured to receive the dropped optical line 303a directly.

In some implementations, the optical splitter 307a is a passive optical power splitter. In other implementations, the optical splitter 307a is a wave division multiplexer. In still other implementations, the optical splitter 307a may otherwise split the optical signals.

In some implementations, the splitter output lines 307b are separate from each other. In other implementations, the splitter output lines 307b are ribbonized (i.e., embedded within adhesive) or held within a jacket between the splitter 307a and a fanout 307d. The splitter output lines 307b separate out from each other at the fanout 307d.

In accordance with some aspects of the disclosure, each optical line 303 is formed by two or more optical fibers that are optically spliced (e.g., fusion spliced) together. In certain implementations, the first multi-fiber connector 304 terminates first ends of first optical fibers 321 and the second multi-fiber connector 305 terminates second ends of second optical fibers 322. Second ends of at least some of the first optical fibers 321 are optically coupled to the first ends of the second optical fibers 322 at one or more optical splices. In the example shown, the second ends of the at least some of the first optical fibers 321 are optically coupled to the first ends of the second optical fibers 322 at a mass fusion splice 308.

In certain implementations, the first optical fibers 321 of the indexed optical lines 303b can be ribbonized together. The second optical fibers 322 of the indexed optical lines 303b can be ribbonized together to facilitate splicing to the first optical fibers 321 (e.g., at a mass fusion splice 308).

In certain implementations, the dropped optical line is partially formed by one of the first optical fibers 321. In some examples, the second end of the first optical fiber 321 of the dropped optical line 303a can be spliced to a first end of a third optical fiber at an optical splice 309. A second end of the third optical fiber can be terminated by the non-ruggedized single-fiber connector 306. In other examples, the second end of the first optical fiber 321 of the dropped optical line 303a can be spliced to the splitter arrangement 307. For example, the second end of the first optical fiber 321 can be spliced to the splitter input line 307c at an optical splice 309.

Figure 7:
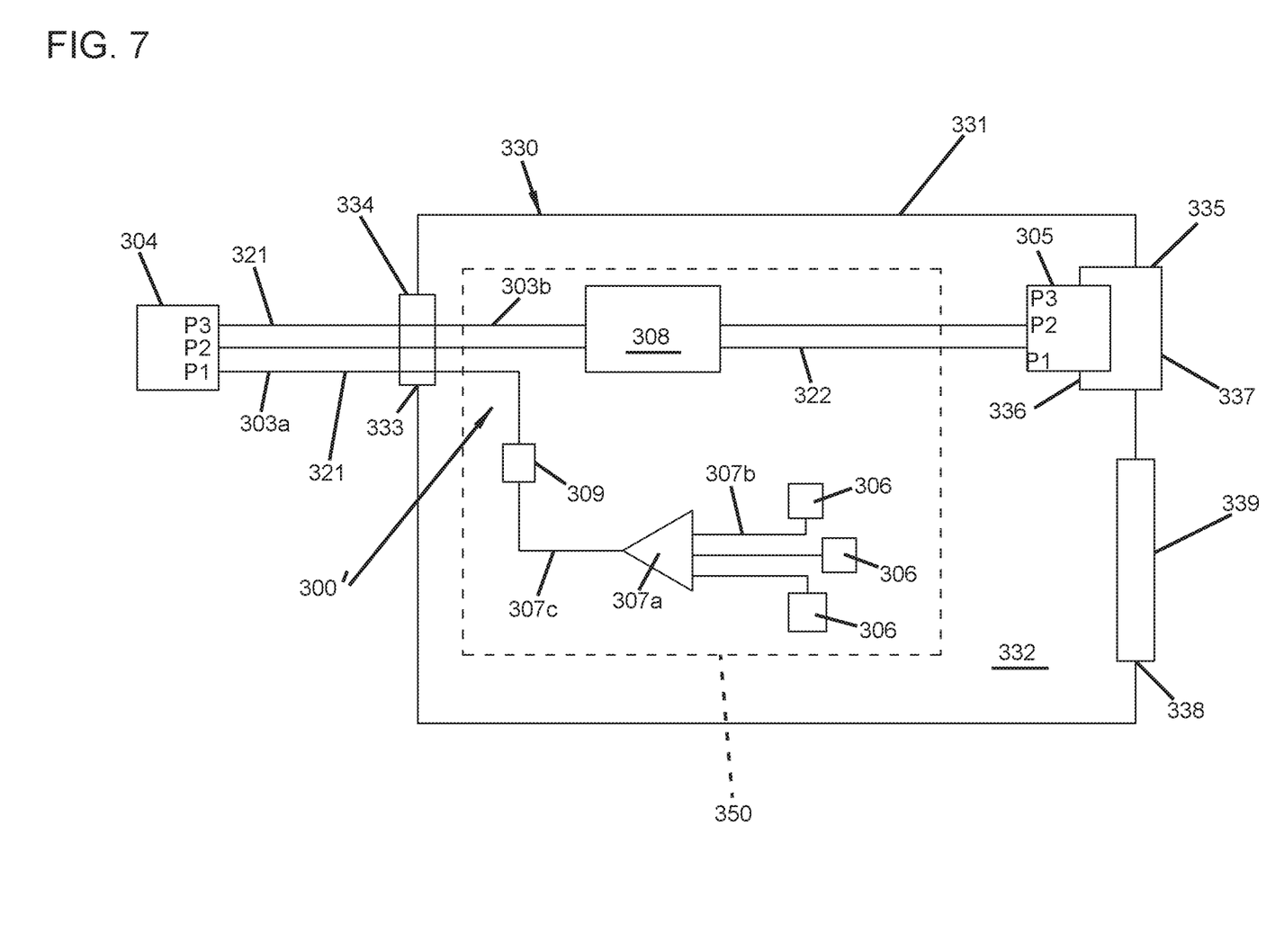
FIG. 7 illustrates another example enclosure including a housing in which the indexing cable arrangement of FIG. 6 is installed, the housing including a ruggedized, multi-fiber connection interface location.

FIG. 7 illustrates another example enclosure 330 includes a housing 331 defining an interior 332. In certain implementations, the housing 331 is re-enterable. The housing 331 is suitable for use with either cable arrangement 300, 300' disclosed herein. The cable arrangement 300' is illustrated in FIG. 7.

The housing 331 defines a cable port 333 extending between an exterior of the housing and the interior 332 of the housing 331. A sealing arrangement 334 is disposed at the cable port 333 to environmentally seal the interior 332 of the housing 331. In an example, the sealing arrangement 334 includes a gasket (e.g., an O-ring, a gel-seal member, a foam block, etc.) through which the cable 300, 300' passes. In some implementations, the cable 300, 300' is movable (e.g., slidable) through the cable port 333 and sealing arrangement 334. In other implementations, the cable 300, 300' is fixed at the cable port 333.

The optical lines 303 enter the housing 331 through the cable port 333 such that the first multi-fiber connector 304 is disposed external of the housing 331 and the second multi-fiber connector 305 is disposed within the interior 332 of the housing 331. The single-fiber connectors 306 also are disposed within the interior 332 of the housing 331.

The housing 331 defines an optical connection interface location 335. In certain implementations, the connection interface location 335 includes an optical adapter having an inner port 336 accessible from within the interior 332 of the housing 331 and an outer port 337 accessible from an exterior of the housing 331. The second multi-fiber connector 305 is plugged into the inner port 336 of the optical adapter 335. In certain implementations, the optical connection interface location 335 is ruggedized so that the interior 332 of the housing 331 remains environmentally sealed regardless of whether or not a plug connector is received at the outer port 337.

In certain implementations, the housing 331 also defines a cable access region 338 at which optical fibers (e.g., subscriber lines) can enter the housing 331 to connect to the single-fiber connectors 306. In certain implementations, one or more optical adapters corresponding to the single-fiber connectors 306 are disposed within the interior 332 of the housing 331.

In some implementations, the cable port 333, the connection interface location 335, and the cable access region 338 are defined at the same side of the housing. In other implementations, one or more of the cable port 333, the connection interface location 335, and the cable access region 338 can be defined at a different side of the housing 331.

In certain implementations, a movable base 350 (e.g., a bulkhead, tray, drawer, or other such carrying structure) is disposed within the housing 331. In an example, the base 350 pivots relative to the housing 331. In another example, the base 350 slides relative to the housing 331. In another example, the base 350 is removable relative to the housing 331. The single-fiber connectors 306 are mounted to the base 350.

In certain implementations, the splitter arrangement 307 is mounted to the base 350. In certain implementations, the splice 309 between the splitter arrangement 307 and the dropped optical line 303a is mounted to the base 350. In certain implementations, the splice 308 between the first and second optical fibers 321, 322 of the indexed optical lines 303b is mounted to the base 350.

Figure 8:
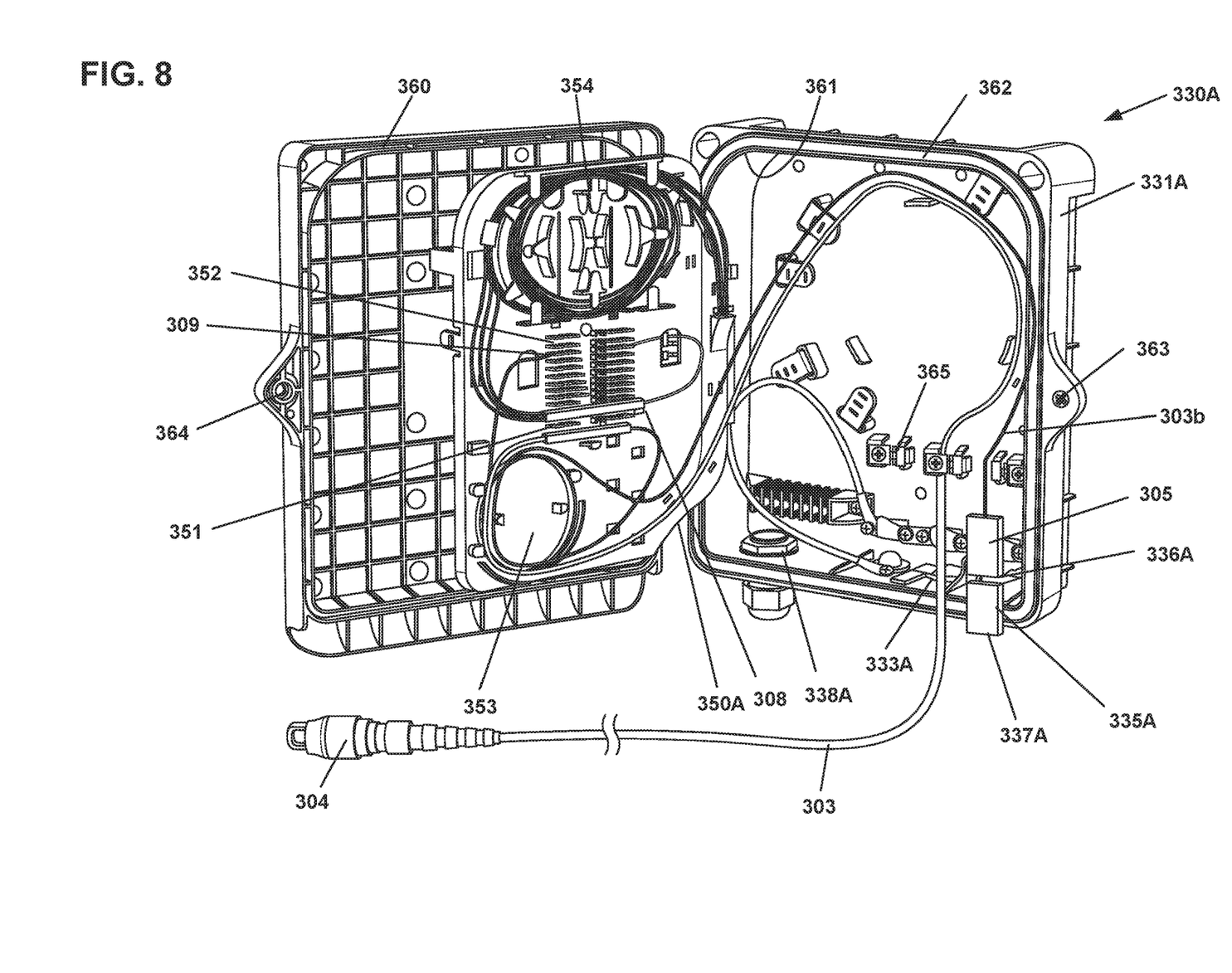
FIG. 8 illustrates an example implementation of the enclosure of FIG. 7.

FIG. 8 illustrates an example implementation 330A of the enclosure 330 of FIG. 7. The cable arrangement 300' is shown installed at the enclosure 330A. Alternatively, in other examples, the cable arrangement 300 could be installed at the enclosure 330A.

The enclosure 330A includes a housing 331A defining an access opening 361 that can be selectively closed by a cover (or door) 360. In certain implementations, the cover 360 is releasably lockable to the housing 331A in the closed position. For example, a fastener or lock can be inserted through lock retention members 363, 364 defined by the housing 331 and cover 360. In other examples, the cover 360 can be latched or otherwise secured to the housing 331.

A gasket 362 or other sealing member forms an environmental seal between the cover 360 and the housing 331 when the cover 360 is closed. For example, the gasket 362 may extend around a perimeter of the access opening 361. A ruggedized optical adapter 335A, a sealed cable port 333A, and another sealed cable port 338A are disposed in a bottom wall of the housing 331.

One or more cable anchors 365 may be disposed within the housing 331 to secure the cable 300, 300'. For example, a cable anchor 365 may be disposed at the sealed cable port 333A to axially hold the cable 300, 300' at a fixed location relative to the housing 331.

A pivoting panel or tray 350A is disposed within the housing 331. The panel 350A pivots between a first position and a second position. When in the first position, the panel 350A is disposed within the housing 331. When in the second position, the panel 350A extends outwardly through the access opening 361.

The panel 350A has a splice region. In the example shown, the panel 350A has a first splice region 351 for storing the splices (e.g., mass fusion splices) 308 between the optical fibers 321, 322 forming the indexed optical lines 303b. The panel 350A also includes a second splice region 352 for storing the splices 309 between the optical fibers of the dropped optical line(s) 303a.

In certain implementations, the panel 350A has a storage region. In the example shown, the panel 350A has a first storage region 353 for storing excess length of the indexed optical lines 303b. The panel 350A also has a second storage region 354 for storing excess length of the dropped optical line(s) 303a. The second storage region 354 also stores excess length of the splitter output lines 307b.

In certain implementations, the panel 350A holds the single-fiber connectors 306. For example, the single-fiber connectors 306 may be mounted to an opposite side of the panel 350A from the splice region. In certain examples, the single-fiber connectors 306 may be mounted to an opposite side of the panel 350A from the storage region. In certain examples, the dropped optical line(s) 303a and/or splitter output lines 307b are routed from between the sides of the panel 350A along the hinge axis.

Figure 9:
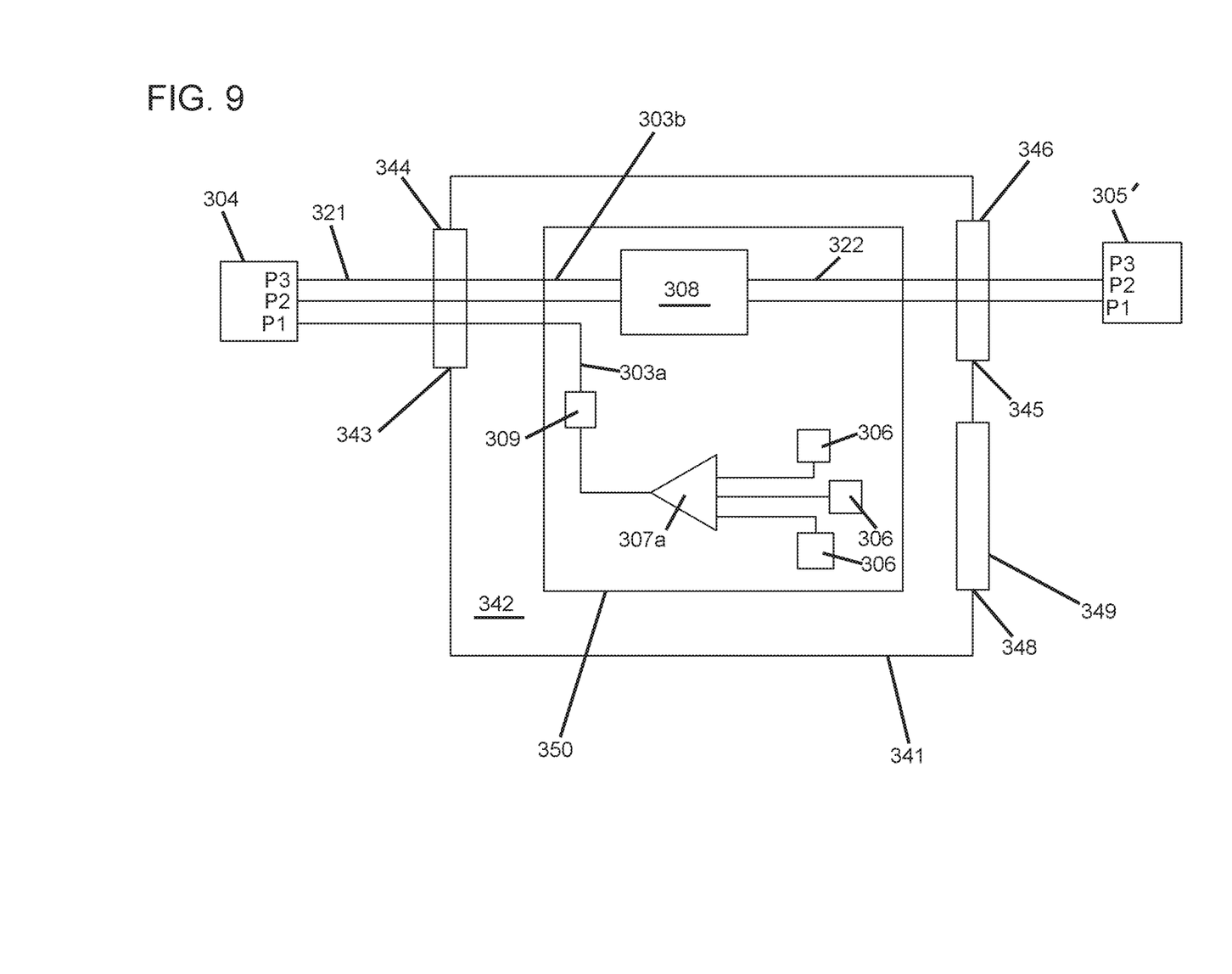
FIG. 9 illustrates another example enclosure including a housing in which the indexing cable arrangement of FIG. 6 is installed, where both multi-fiber connectors extend from the housing.

FIG. 9 illustrates another example enclosure 340 includes a housing 341 defining an interior 342. In certain implementations, the housing 341 is re-enterable. The housing 341 is suitable for use with either cable arrangement 300, 300' disclosed herein. The cable arrangement 300' is illustrated in FIG. 9.

The housing 341 defines a cable port 343 extending between an exterior of the housing and the interior 342 of the housing 341. A sealing arrangement 344 is disposed at the cable port 343 to environmentally seal the interior 342 of the housing 341. In an example, the sealing arrangement 344 includes a gasket (e.g., an O-ring, a gel-seal member, a foam block, etc.) through which the cable 300, 300' passes. In some implementations, the cable 300, 300' is movable (e.g., slidable) through the cable port 343 and sealing arrangement 344. In other implementations, the cable 300, 300' is fixed at the cable port 343.

The optical lines 303 of the cable 300, 300' pass-through the housing 341 such that both the first multi-fiber connector 304 and the second multi-fiber connector 305 are disposed external of the housing 341. The single-fiber connectors 306 are disposed within the interior 342 of the housing 341. In certain implementations, the splitter arrangement 307 is disposed within the interior 342 pf the housing 341.

In certain implementations, the housing 341 defines a first sealed cable port 333, a second sealed cable port 345, and a third sealed cable port 348. A portion of the cable 300, 300' leading to the first multi-fiber connector 304 extends outwardly from the housing 341 at the first sealed cable port 333 and another portion of the cable 300, 300' leading to the second multi-fiber connector 305 extends outwardly from the housing 341 at the second sealed cable port 345. One or more optical fibers (e.g., subscriber lines) may enter the housing 341 through the third sealed cable port 348 to connect to the single-fiber connectors 306 within the housing 341. In other implementations, the housing 341 defines a greater or lesser number of sealed cable ports. For example, each optical fiber to be coupled to the single-fiber connectors 306 may enter through a separate sealed cable port.

In some implementations, the first, second, and third sealed cable ports 343, 345, 348 are defined at the same side of the housing 341. In other implementations, one or more of the sealed cable port 343, 345, 348 can be defined at a different side of the housing 341.

In certain implementations, a movable base 350 (e.g., a bulkhead, tray, drawer, or other such carrying structure) is disposed within the housing 341. In an example, the base 350 pivots relative to the housing 341. In another example, the base 350 slides relative to the housing 341. In another example, the base 350 is removable relative to the housing 341. The single-fiber connectors 306 are mounted to the base 350.

In certain implementations, the splitter arrangement 307 is mounted to the base 350. In certain implementations, the splice 309 between the splitter arrangement 307 and the dropped optical line 303a is mounted to the base 350. In certain implementations, the splice 308 between the first and second optical fibers 321, 322 of the indexed optical lines 303b is mounted to the base 350.

Figure 10:
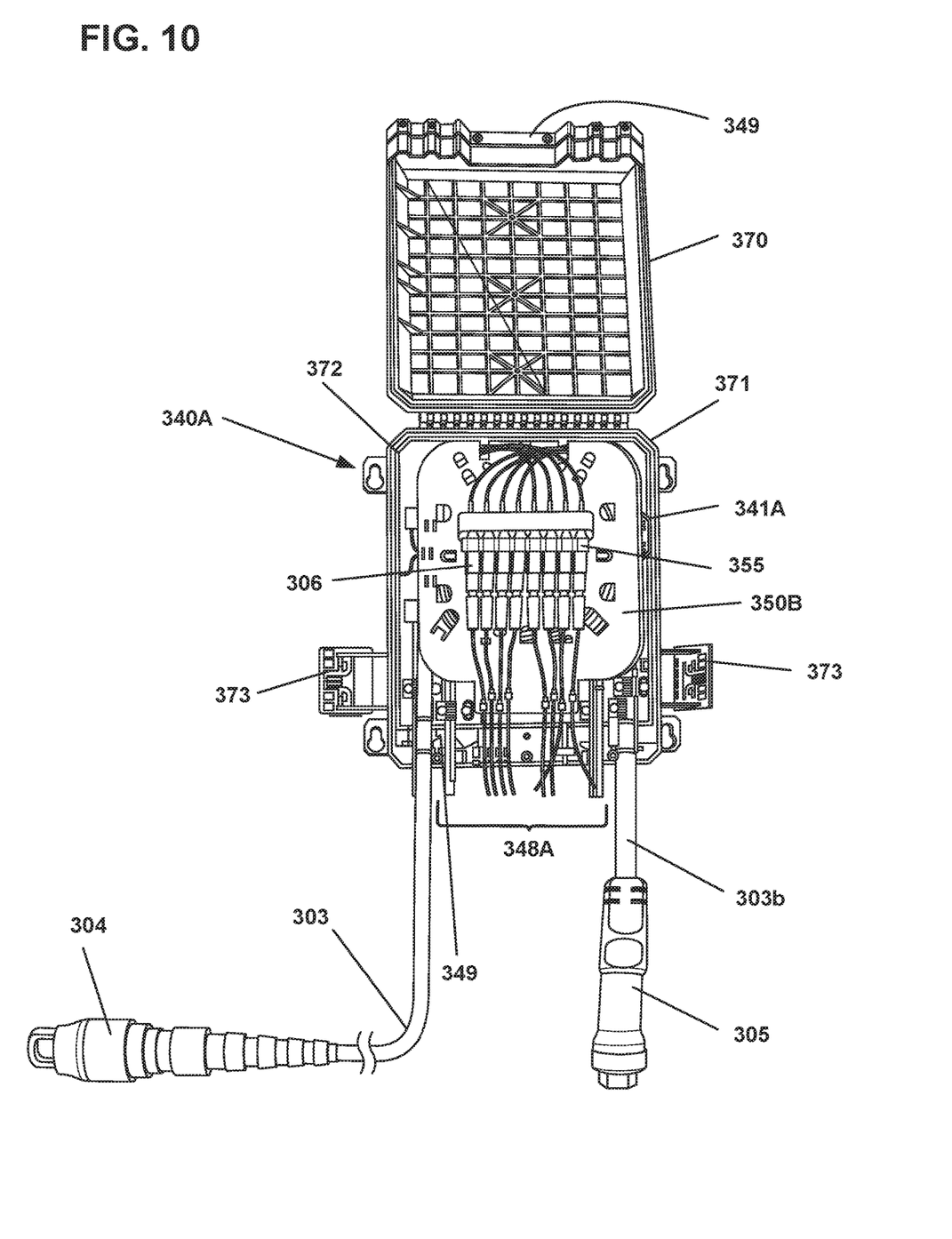
FIG. 10 illustrates an example implementation of the enclosure of FIG. 9.

FIG. 10 illustrates an example implementation 340A of the enclosure 340 of FIG. 9. The cable arrangement 300' is shown installed at the enclosure 340A. Alternatively, in other examples, the cable arrangement 300 could be installed at the enclosure 340A.

The enclosure 340A includes a housing 341A defining an access opening 371 that can be selectively closed by a cover (or door) 370. In certain implementations, the cover 370 is releasably lockable to the housing 341A in the closed position. For example, latches 373 on the housing 331A can snap-fit over the cover 370.

A gasket 372 or other sealing member forms an environmental seal between the cover 370 and the housing 341A when the cover 370 is closed. For example, the gasket 372 may extend around a perimeter of the access opening 371. A sealed cable access region is disposed at a bottom wall of the housing 331. The sealed cable access region includes one or more sealing members 349 (e.g., gel blocks, foam blocks, rubber gaskets, etc.) that environmentally seal around one or more cables entering the enclosure 340A. In the example shown, all of the cables pass through the same cable access region 348A between opposing gel blocks. In other examples, each cable may enter the enclosure 340A through a respective sealed cable port.

A pivoting tray 350B is disposed within the housing 341A. The panel 350B pivots between a first position and a second position. When in the first position, the panel 350B is disposed within the housing 341A. When in the second position, the panel 350B extends outwardly through the access opening 371.

The panel 350B holds the single-fiber connectors 306. In certain implementations, the panel 350B includes a termination region 355 at which one or more optical adapters are mounted. The single-fiber connectors 306 can be held at first ports of the optical adapters. Second ports of the optical adapters face the cable access region 348A. Optical fibers (e.g., subscriber lines) may enter the enclosure 340A through the sealed cable access region 348 and plug into the second ports to optically couple to the dropped optical line(s) 303a.

In certain implementations, the panel 350B also has a splice region. For example, the panel 350B may have a first splice region for storing the splices (e.g., mass fusion splices) 308 between the optical fibers 321, 322 forming the indexed optical lines 303*b*. The panel 350B also may include a second splice region for storing the splices 309 between the optical fibers of the dropped optical line(s) 303*a*. For example, the splice region may be mounted to an opposite side of the panel 350A from the single-fiber connectors 306.

In certain implementations, the panel 350B has a storage region. In the example shown, the panel 350B may have a first storage region for storing excess length of the indexed optical lines 303*b*. The panel 350B also may have a second storage region for storing excess length of the dropped optical line(s) 303*a*. The second storage region also may store excess length of the splitter output lines 307*b*. In certain examples, the storage region may be mounted to an opposite side of the panel 350B from the single-fiber connectors 306.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A cable arrangement comprising:
    a housing including a multi-fiber optical adapter, the housing also including a pivoting panel that carries an optical splitter, the pivoting panel being pivotal relative to the multi-fiber optical adapter, the housing defining an access opening configured to be selectively closed by a cover to enclose the pivoting panel and the multi-fiber optical adapter, the cover being sealed to the housing when closed;
    a cable including a plurality of optical lines extending between first ends and second ends;
    a ruggedized multi-fiber connector disposed at the first ends of the optical lines;
    a non-ruggedized single-fiber connector disposed at the second end of a first of the optical lines of the cable; and
    a non-ruggedized multi-fiber connector disposed at the second ends of others of the optical lines of the cable, the others of the optical lines being indexed between the ruggedized multi-fiber connector and the non-ruggedized multi-fiber connector.

2. The cable arrangement of claim 1, wherein the others of the optical lines include first optical fibers extending from the ruggedized multi-fiber connector and second optical fibers extending from the non-ruggedized multi-fiber connector, the first optical fibers being spliced to the second optical fibers.

3. The cable arrangement of claim 2, wherein the first optical fibers are spliced to the second optical fibers at a mass fusion splice.

4. The cable arrangement of claim 1, wherein the first optical line includes a first optical fiber terminated at the ruggedized multi-fiber connector and extending from the ruggedized multi-fiber connector to an optical splice.

5. The cable arrangement of claim 4, wherein the first optical line also includes a second optical fiber terminated at and extending from the non-ruggedized single-fiber connector to the optical splice at which the second optical fiber is spliced to the first optical fiber.

6. The cable arrangement of claim 4, wherein the first optical line also includes an output fiber extending away from the optical splitter, the output fiber being terminated by the non-ruggedized single-fiber connector, the optical splitter receiving optical signals from the first optical fiber.

7. The cable arrangement of claim 6, wherein the non-ruggedized single-fiber connector is one of a plurality of non-ruggedized single-fiber connectors; and wherein the output fiber is one of a plurality of output fibers extending from the optical splitter, the optical splitter splitting the optical signals received from the first optical fiber onto the plurality of output fibers, each of the output fibers being terminated by one of the non-ruggedized single-fiber connectors.

8. The cable arrangement of claim 7, wherein the first optical line also includes an input fiber leading to the optical splitter, the input fiber being optically spliced to the first optical fiber.

9. The cable arrangement of claim 7, wherein the output fibers extend together from the optical splitter to an optical fanout at which the output fibers are separated.

10. The cable arrangement of claim 6, wherein the optical splitter is an optical power splitter.

11. An enclosure arrangement comprising:
    a re-enterable housing defining an interior and a first sealed port leading to the interior the housing including a base and a cover that moves relative to the base to open and close the interior;
    a pivotal member disposed within the housing;
    a splitter disposed within the interior of the housing, the splitter being carried by the pivotal member as the pivotal member pivots relative to the housing;
    a multi-fiber optical adapter disposed at the housing so that the pivotal member pivots relative to the multi-fiber optical adapter;
    a cable arrangement including a plurality of optical lines extending between first ends and second ends, the optical lines extending through the first sealed port so that the first ends are external of the housing and the second end of at least one of the optical lines is disposed within the housing;
    a first multi-fiber connector disposed at the first ends of the optical lines of the cable, the first multi-fiber connector being ruggedized;
    a single-fiber connector disposed at the second end of the at least one of the optical lines, the single-fiber connector being non-ruggedized, the single-fiber connector being accessible when the housing is open and being not accessible when the housing is closed; and
    a second multi-fiber connector disposed at the second ends of others of the optical lines of the cable, the others of the optical lines being indexed between the first multi-fiber connector and the second multi-fiber connector, the second multi-fiber connector received at a port of the multi-fiber optical adapter.

12. The enclosure arrangement of claim 11, wherein the second multi-fiber connector is non-ruggedized.

13. The enclosure arrangement of claim 12, further comprising an optical adapter carried by the housing, the optical adapter having a non-ruggedized port accessible from within the interior of the housing; and wherein the second multi-fiber connector is plugged into the non-ruggedized port of the optical adapter.

14. The enclosure arrangement of claim 11, wherein the multi-fiber optical adapter has a ruggedized port accessible from an exterior of the housing.

15. The enclosure arrangement of claim 11, wherein the multi-fiber optical adapter has a non-ruggedized port accessible from within the interior of the housing.

16. The enclosure arrangement of claim 11, wherein the second multi-fiber connector is ruggedized and disposed external of the housing.

17. The enclosure arrangement of claim 11, wherein the single-fiber connector is one of a plurality of single-fiber connectors that each terminate an optical fiber that is optically coupled to the first multi-fiber connector.

18. The enclosure arrangement of claim 17, wherein the optical fibers terminated by the single-fiber connectors include output fibers extending from an optical splitter.

19. The enclosure arrangement of claim 17, wherein the non-ruggedized single-fiber connectors are disposed on the pivotal member, the pivotal member being a panel that is movable relative to the housing.

20. The enclosure arrangement of claim 11, wherein the housing also includes a sealed cable access region at which a subscriber line can enter the housing and be routed to the single-fiber connector.

21. The enclosure arrangement of claim 11, wherein the others of the optical lines include first optical fibers extending from the first multi-fiber connector and second optical fibers extending from the second multi-fiber connector, the first optical fibers being spliced to the second optical fibers at a mass fusion splice.

22. The cable arrangement of claim 11, wherein the at least one optical line includes a first optical fiber extending from the first multi-fiber connector to an optical splice.

23. The cable arrangement of claim 22, wherein a splitter arrangement is spliced to the first optical fiber.

24. The cable arrangement of claim 22, wherein a second optical fiber is spliced to the first optical fiber, the second optical fiber being terminated by the single-fiber connector.

* * * * *

UNITED STATES PATENT AND TRADEMARK OFFICE
CERTIFICATE OF CORRECTION

Page 1 of 1

PATENT NO. : 11,579,392 B2
APPLICATION NO. : 17/272224
DATED : February 14, 2023
INVENTOR(S) : Patrick Jacques Ann Diepstraten et al.

It is certified that error appears in the above-identified patent and that said Letters Patent is hereby corrected as shown below:

On the Title Page

Item (57) Abstract, 3rd Line: "between a first;" should read --between a first,--

Signed and Sealed this
Twenty-seventh Day of June, 2023

Katherine Kelly Vidal
*Director of the United States Patent and Trademark Office*